Dec. 12, 1972  YUNG-CHUN WU  3,706,007
OVERLOAD AND SHOCK PROTECTIVE DEVICE
Filed March 23, 1971  4 Sheets-Sheet 4

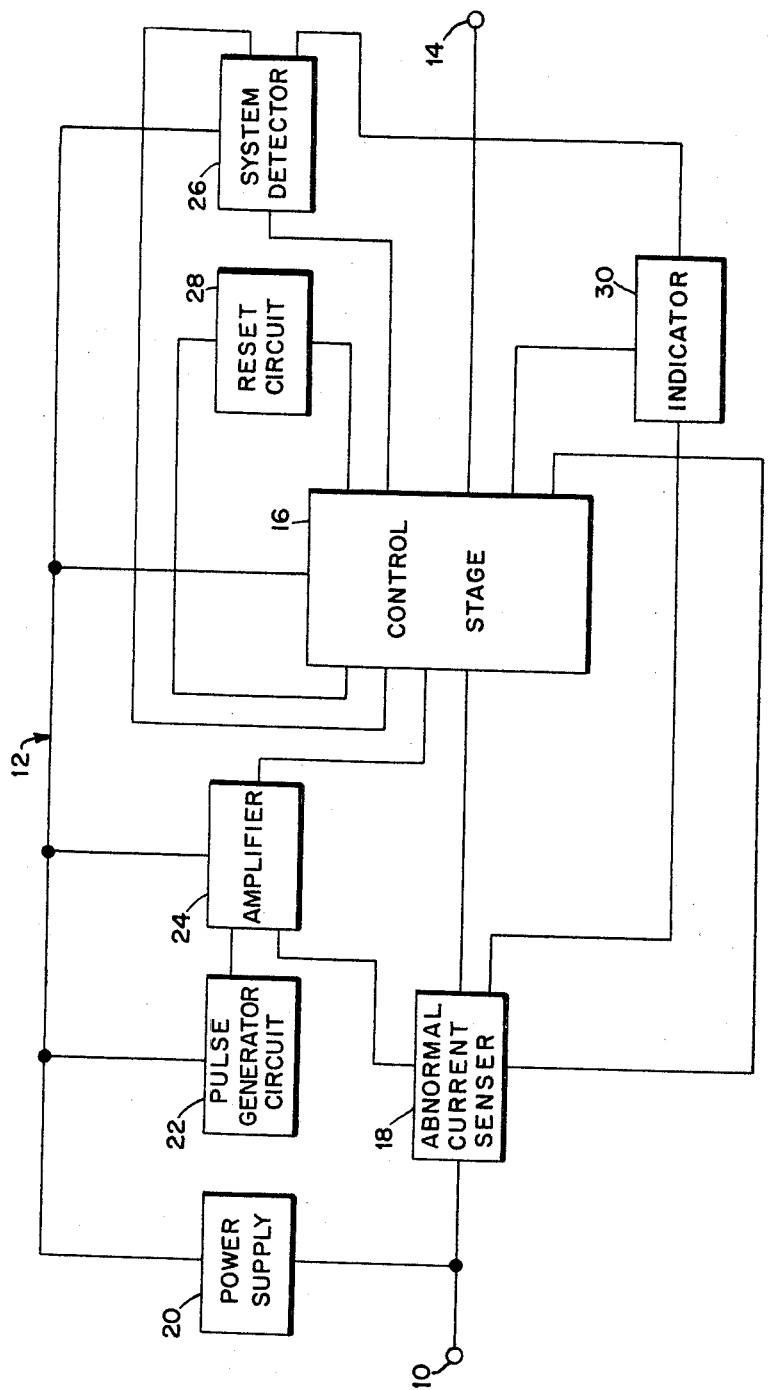

United States Patent Office 3,706,007
Patented Dec. 12, 1972

3,706,007
OVERLOAD AND SHOCK PROTECTIVE DEVICE
Yung-Chun Wu, 9–1, Alley 7, Yang Ming Li,
Yang Ming Shan, Taipei, China
Filed Mar. 23, 1971, Ser. No. 127,320
Int. Cl. H02h 3/28
U.S. Cl. 317—18 D    13 Claims

ABSTRACT OF THE DISCLOSURE

Disclosed herein is a protective circuit for disconnecting a load from a voltage source in response to the detection of an electrical overload or an excess of leakage current. The protective device, which is coupled in series with the voltage source and load, includes a power supply for converting the source voltage into a potential for use by the protective device; a pluse generator for use in detecting malfunctions in the protective circuit; a current sensor for producing an output signal under conditions of abnormal current flow; an amplifier for amplifying the output signals of the pulse generator and the current sensor; a control stage for opening and closing a current path from the potential source to the load in response to an output signal from the amplifier; a reset circuit for automatically resetting the control stage when a previously detected malfunction has been remedied; a system detector for monitoring the operation of the previously mentioned devices, and for detecting failures thereof by monitoring the amplified pulses, for actuating the control stage; and an indicator responsive to the control stage, the curernt sensor and the detector for indicating the presence of a malfunction, and the nature of such malfunction.

BACKGROUND OF THE INVENTION

Prior art protective devices for power supplies, such as circuit breakers, devices for tracing short circuits, and short circuit detectors, normally disconnect the circuit under a heavy current condition, such as an over-load or short circuit situation. Generally, however, such prior art circuits require a malfunction to occur for several seconds before actuation to disconnect the load from the supply source. This delayed operation of such devices often permits the occurrence of severe damage, such as by fire, and may result in injury or death to persons working with or near such circuits.

Further disadvantages with regard to such prior art devices arise due to failures of the devices themselves, which occassionally cause damage to the circuit being protected.

Therefore, it is an object of the present invention to provide a protective device for sensing the flow of excessive load and leakage currents between an AC source and a load, and for opening the circuit between such devices within a few milli-seconds of the time at which the overload is detected. Thus, the device of the present invention provides adequate protection for the load, while also preventing excessive electric shocks to persons coming into contact with the load.

An additional object of this invention is to provide a self-detecting system which employs means to indicate the nature of a malfunction, means to indicate the presence of a malfunction in the detecting device itself, and means to automatically reclose the circuit between the potential source and the load upon removal of the previously detected malfunction.

Other objects and advantages of this invention will become apparent from the following disclosure.

SUMMARY OF THE INVENTION

In accordance with the present invention, there is provided an overload and shock protective device for an electrical circuit, and more particularly, a protective device for disposition in series with an AC potential source and a load, for opening such series circuit upon detection of load or leakage overload current. For example, such overload current may result from a short circuit, or a person subjected to an electrical shock as a result of touching a bare wire. This function is performed by a control stage which operates a relay switch to make or break the series circuit. The control stage operates in response to a signal from a current sensor and amplifier combination, which combination produces an instruction signal for the control stage when a malfunction is sensed.

Specifically, the invention provides a power supply for the protective circuitry, a current sensor for sensing the load and leakage current, and for generating an output signal when either of those currents exceeds a predetermined value, and an amplifier for amplifying the outputs of a pulse generator and the current sensor to apply those signals to the control state. Thus, the control stage function to open the relay switch upon reception of an amplified output from the current sensor, which output indicates an abnormal current flow. A reset circuit is connected to the control stage to reset the relay switch when the current sensor indicates that the previously detected malfunction has been remedied. Also, a system detector is coupled to the control stage to detect malfunctions in the protective circuit, and to actuate the control stage to open the relay switch when a malfunction is sensed. Finally, an indicator is coupled to the control stage, the current sensor and the system detector, for indicating the operational conditions of the device, and for indicating the occurrence and types of malfunctions as they are sensed.

The separate power supply is provided to prolong the life of the protective circuit by supplying power thereto only when a load is connected across the output terminals of the potential source and protective device.

The purpose of the pulse generator is to produce a continuous pulse train for use by the protective circuit to sense the continued proper operation thereof.

The current sensor, which produces an output signal in response to the sensing of an abnormal current flow, produces a signal of such magnitude that when coupled through the amplifier, it will ensure the opening of the series connected relay switch in the control stage. Under both overload and excessive leakage conditions, the current sensor continues to generate an abnormal current flow signal, even though the relay switch is opened. In the overload condition, this is accomplished by a very low voltage, an AC signal from the power supply. Also, upon opening of the relay switch, the indicator device continues to indicate the type of failure which has occurred.

Therefore, the preferred embodiment according to this invention detects load and leakage overload conditions, instantaneously opens the circuit between the potential source and the load upon sensing such overload conditions, maintains the series circuit in an open condition until the malfunction has been removed, and then automatically resets the protective device to reconnect the potential source and the load when the malfunction has been removed.

BRIEF DESCRIPTION OF THE DRAWINGS

The accompanying drawings illustrate a preferred embodiment of the invention. In such drawings:

FIG. 1 is a block diagram of the protective circuit device of a preferred embodiment of this invention;

DETAILED DESCRIPTION OF THE PREFERRED EMBODIMENT

Figure 2A:
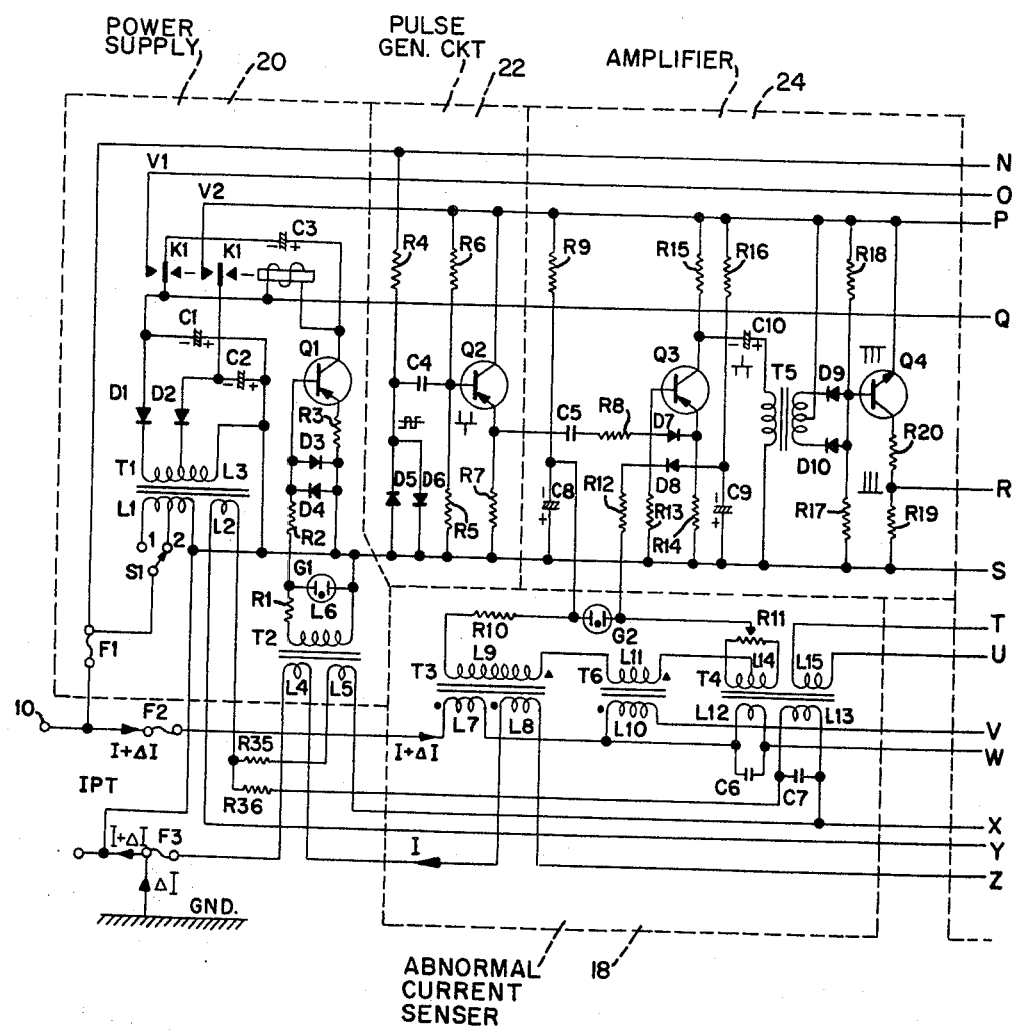
FIG. 2 is a schematic diagram of the device illustrated in FIG. 1.

In a preferred embodiment of the present invention, as illustrated in block form in FIG. 1, an input terminal 10, for connection to an AC power source, is connected through a protective circuit device 12 to an output terminal 14 for connection to a load. Thus, the protective circuit device 12 is connected in series between a potential source and a load, and said device 12 includes switch means in a control stage 16 for opening and closing the series circuit in response to the presence or absence of an overload condition detected by an abnormal-current sensor 18.

A power supply 20 is connected to the AC source at the terminal 10 to process the AC voltage into a DC supply voltage for the circuitry of the protective circuit, and the power supply 20 provides a supply voltage for a pulse generator 22, an amplifier 24, the control stage 16, and a system detector 26.

Both load and leakage currents supplied to the output terminal 14 flow through the current sensor 18 and that circuit comprises means for generating an output signal when the current flow is determined to be abnormal. The output signal is coupled through the amplifier 24, along with the pulse output signal of the pulse generator 22, to provide an operating signal for the control stage 16. When an amplified abnormal current flow signal is received by the control stage, that device interrupts the current path between the current sensor 18 and the output terminal 14 thereby preventing damage or injury to circuits or persons making electrical contact with the output terminal 14. A reset circuit 28 is connected to the control stage to sense the signal coupled thereto from the amplifier, and to reset the control stage to complete the series circuit to the output terminal 14 when a previously detected malfunction has been corrected. The system detector 26 is connected to the control stage to sense the continued proper operation of the protective device, and the detector actuates the control stage to open the series circuit between the current sensor and the output terminal 14 when a malfunction of the protective device is detected.

Finally, an indicator 30 has inputs connected thereto from the current sensor 18, the control stage 16, and the system detector 26, for producing a visual indication of the operating conditions of the protective circuit. That is, the indicator 30 provides information indicating whether or not the control stage has been actuated to open the series circuit, and indicating whether the detected malfunctions are due to a load current overload, a leakage current overload, or a malfunction in the protective circuit itself.

Figure 2B:
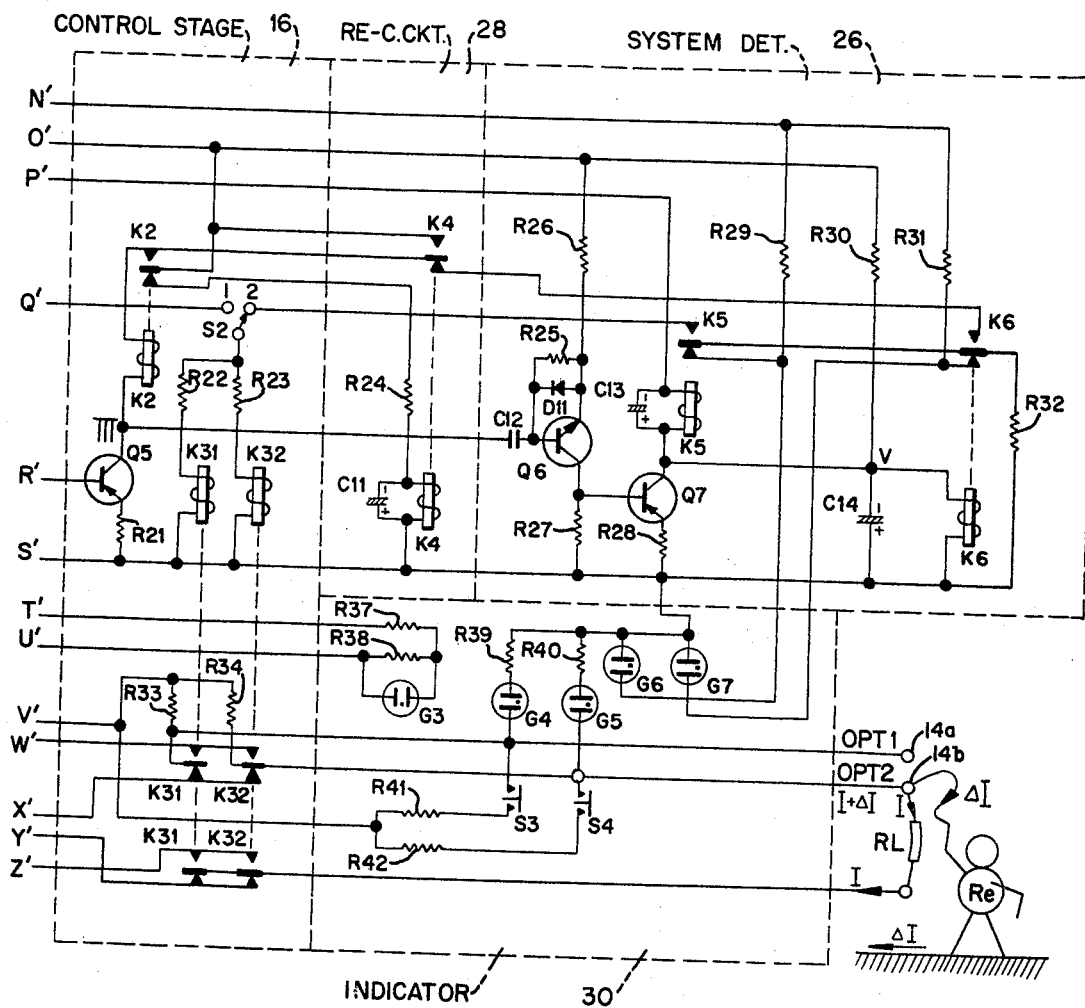
Figure 4A:
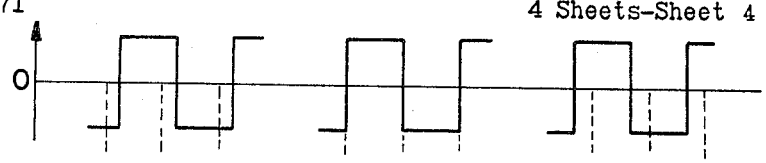
FIGS. 4, 4(a), 4(b), 4(c) are diagrams showing the pulses which are generated under the presence of an error signal.
Figure 4B:
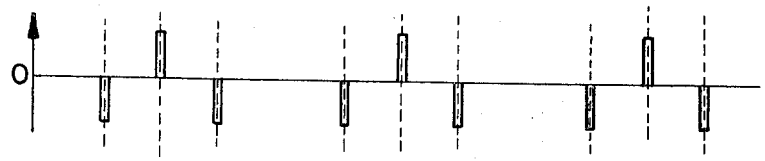
Figure 4C:
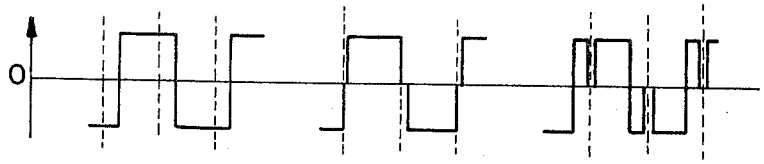
Figure 4D:
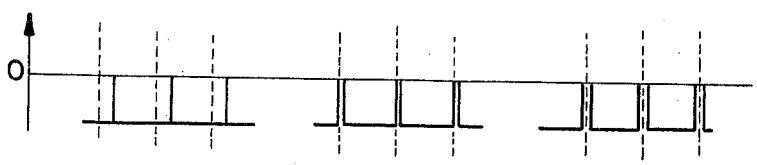
Figure 4E:
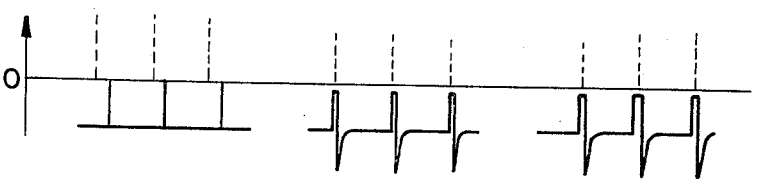

The precise circuitry of the preferred embodiment is illustrated in schematic form in FIGS. 2a and 2b, wherein the circuitry included in each of the blocks of the block diagram is outlined by dotted lines. Also, the conductors which connect the circuit portions of FIGS. 2a and 2b are labelled $n$ and $n'$, $z$, $z'$. FIG. 2a shows the components and their connections of the power supply, the pulse generator, the amplifier, and the current sensor, while FIG. 2b shows the control stage, the reset circuit, the system detector and the indicator.

In the power supply, as shown in FIG. 2a, a transformer $T_1$ transforms part of the power from the input terminals, applied from terminal 10 to ground. Transformer $T_1$ has a center tapped primary winding $L_1$, said winding having one end lead connected to ground, and the other end lead or center tap lead connected to the terminal 10 through a selector switch $S_1$. Thus, depending on the amplitude of the line voltage, switch $S_1$ is placed in position 1 or 2 to control the voltage output of the power supply. Secondary winding $L_3$ is also formed by a center tapped winding having one end connected to ground, and having its other two leads connected through rectifying diodes $D_1$ and $D_2$ to a capacitor circuit formed by capacitors $C_1$ and $C_2$ to provide two different DC output voltages which are coupled to the contacts of a relay $K_1$. Thus, whenever an AC supply voltage is connected across the input terminals from terminal 10 to ground, the two DC voltages are produced by the power supply, and such voltages are coupled to the remaining portions of the protective circuit whenever relay $K_1$ is energized. A second transformer $T_2$ is included in the power supply, and has a primary winding $L_4$ connected in a return line from the load. Thus, whenever a load current is flowing through the protective circuit, an AC voltage is produced on the secondary winding $L_6$ of transformer $T_2$ said voltage being fed to a transistor $Q_1$ which controls the energization of relay $K_1$. Thus, if there is no load connected in the circuit, then the protective circuit remains de-energized since the DC voltages of the power supply are isolated from the remaining portions of the protective circuit by the contacts of relay $K_1$.

A regulating circuit interconnects the secondary winding $L_6$ with the relay energizing transistor $Q_1$, in order to provide a constant bias voltage for relay $K_1$ for any load current above a predetermined value. The relay circuit includes a resistor $R_1$ and a tube $G_1$ connected across the secondary winding $L_6$ for providing a constant voltage across the tube $G_1$. The tube $G_1$ is protected against an over current by the transformer core $T_2$ having a cross sectional area which limits the magnetic flux generated by the bad current through the primary $L_4$. Also, a pair of diodes $D_3$ and $D_4$ are connected in parallel, with opposing polarities, in the base-emitter circuit of the transistor $Q_1$. A resistor $R_3$ is connected between the emitter and the diode pair, and a resistor $R_2$ is connected between the base of the transistor $Q_1$ and the tube $G_1$, so that the bias voltage to the transistor $Q_1$ is further regulated. That is, the diodes limit the AC voltage supply to the transistor $Q_1$ to the threshold values of the diodes, normally, about 0.8 volts. Thus, whenever a load current exceeds a predetermined minimum, the transistor $Q_1$ is brought into conduction to energize relay $K_1$. However, since transistor $Q_1$ is a PNP type transistor, it will conduct only during the negative half cycles of the bias voltage applied thereto. Therefore, a capacitor $C_3$ is coupled in parallel with the coil of the relay $K_1$ to effectively smooth out the voltage applied thereto. On the other hand, if the voltage from the coil $L_6$ is rectified and filtered prior to its application, differentiated voltages are coupled through the transistor since transistor $Q_1$ would then conduct continuously.

Use of the power supply 20 results in an increase of the life-time of the protective circuit, since the supply voltage therefor is supplied only when the output terminal 14 is loaded. Of course, under certain circumstances wherein the load is under continuous operation, it is not necessary to control the application of the power supply voltages, and therefore, the supply voltages $V_1$ and $V_2$ can be coupled directly from the filter capacitors $C_1$ and $C_2$ rather than through the contacts of the relay $K_1$. Also, if desired, the relay $K_1$ and its control circuitry can be replaced by a manual switch.

The pulse generator 22 produces a pulse output by differentiating the AC source potential. The AC voltage is coupled to the base of a transistor $Q_2$ through a resistor $R_4$ and a capacitor $C_4$. The junction of the resistor $R_4$ and capacitor $C_4$ is coupled through a pair of opposed polarity diodes to ground, so that the voltage applied to the transistor is limited to the threshold voltage of the diodes. A bias voltage is applied to the transistor by resistors $R_5$ and $R_6$, forming a voltage divider between the supply voltage $V_2$ and ground, so that both the positive and negative differentiated voltages are coupled through the transistor $Q_2$. The period of the pulses is determined by the supply voltage, and the duration of each pulse is dependent on the values of the capacitor $C_4$ and the resistor $R_5$ which form the differentiating circuit. Normally, resistor $R_6$ does not affect the duration of the pulses since that resistor has a much greater value than resistor $R_5$.

The PNP transistor $Q_2$ has a resistor $R_7$ connected between its emitter and ground, and the output pulses from the pulse generator are developed across that resistor. Thus, the AC supply voltage is converted into a square wave by the diodes $D_5$ and $D_6$, and the square wave is differentiated to provide a pulse output signal at the junction of the emitter of transistor $Q_2$ and the resistor $R_7$.

The pulses from the pulse generator 22 are applied to the amplifier 24 through a coupled capacitor $C_5$, and a resistor $R_8$, wherein the capacitor $C_5$ isolates the input of the amplifier from the DC voltage of the transistor $Q_2$. In effect, the transistor $Q_2$ acts merely as a buffer transistor, and, if desired, the differentiated pulses could be coupled directly to the amplifier from the capacitor $C_4$, but, in this case, the width of the pulse would be determined by the equivalent of the impedance of the input network of the amplifier.

The amplifier 24 also receives an input signal from the current sensor circuit 18 which circuit includes transformers $T_3$, $T_4$, $T_6$, and another regulating device tube $G_2$. The sensor circuit generates an output signal when it detects the presence of an abnormal current flowing therethrough. Thus, as shown in the drawings, the load current I flows from terminal 10 through the current sensor 18, and through the control stage to the output terminal 14.

Transformer $T_3$ comprises the principal sensing transformer, while transformer $T_4$ is a compensating transformer which compensates transformer $T_3$ for the inherent imbalance between primary coils $L_7$ and $L_8$ of transformer $T_3$. Then, transformer $T_6$ is used to generate an error signal when an abnormal current condition is sensed by transformers $T_3$ and $T_4$.

Regarding the operation of transformer $T_3$, if it is assumed that the coils $L_7$ and $L_8$ have windings $N_7$ and $N_8$, and that the currents flowing through these two coils are $I_7$ and $I_8$, then the net flux in the core of transformer $T_3$ is approximately equal to $$\phi = N_7 I_7 + N_8 I_8$$

It is further assumed that the load $R_L$ and the leakage resistance $R_e$ are connected to the output terminals, thereby resulting in a load current I and a leakage current $\Delta I$, and that $N_8 = N$, and $N_7 = N + \Delta N$, then, with reference to transformer $T_3$, the following expressions hold true:

$$I_7 = I + \Delta I \text{ and } I_8 = -I$$
$$\phi = (N + \Delta N)(I + \Delta I) + N(-I)$$
$$\phi = (N + \Delta N)\Delta I + I(\Delta N), \text{ and for } \Delta N \ll N$$
$$\phi \simeq N(\Delta I) + I(\Delta N), \text{ where N and } \Delta N \text{ are fixed positive values.}$$

From this formula, it can be seen that the flux may exceed some predetermined value and induce a sufficiently strong error signal if the load current or the leakage current exceeds the predetermined tolerable value. Also, it is obvious than an increase in N will increase the sensitivity, and an increase in $\Delta N$ will lower the tolerable current level of the load current. Therefore, if these values are adequately selected, a tolerable range for the leakage and load currents is determined. However, if those currents exceed the predetermined limit, then the transformer $T_3$ will generate a sufficiently large error signal to drive the control stage to disconnect the AC source from the load. As shown by the dots associated with transformer $T_3$, the coils $L_7$ and $L_8$ cause the cancellation of the magnetic field, so that each coil performs as a purely resistive device. However, since the transformer is connected in series with the load current, the current sensor must be designed to provide a low power dissipation. Thus, the wire used for coil $L_7$ and $L_8$, must have a large diameter, as in the case, for example, of a transformer for a large power supply.

The secondary coil $L_9$ of the transformer $T_3$ has a large number of turns, so that a very small flux in the coil will cause a workable signal in the secondary coil $L_9$. Thus, the cross sectional area of the core may be reduced thus decreasing the size of the transformer $T_3$, and limiting the voltage applied to the secondary $L_9$ by extremely heavy abnormal load currents applied to the primary winding of that transformer. In an exemplary device, the cross sectional core area of the transformer $T_3$ can be made about .25 square inch, whereby it will have a sensitivity of about 100 $\mu$amp when coil $L_7$ and $L_8$ have 360 turns. If a higher sensitivity is required, the cross sectional area of the core can be increased or the number of turns on the coils can be increased.

The quantity $\Delta N$, as used in the above formula, can normally be limited to less than one thousandth of a turn, and this quantity is compensated for by the transformer $T_4$. The primary coil $L_{12}$ of transformer $T_4$ is coupled in series with the load, and comprises an inductor, so that its number of turns should be limited to as few as possible. A center tap secondary winding $L_{14}$ of transformer $T_4$ has a potentiometer $R_{11}$ connected in parallel therewith, so that the AC voltage induced across the secondary can be tapped by the potentiometer to provide a variable voltage. Thus, the unbalanced condition between coils $L_7$ and $L_8$ can be compensated by the positioning of the potentiometer $R_{11}$. The primary winding $L_{12}$ of the transformer $T_4$ has a capacitor $C_6$ connected in parallel therewith to avoid the generation of an error signal when a "small" temporary overload current is sensed, such as at the instant of connection of an inductive load. $L_{15}$ which is a coil for generating an overload indication signal, will be discussed below, along with the function of winding $L_{13}$ and transformer $T_6$.

The error signal generated by the sensor circuit is regulated by the tube $G_2$, and the voltage developed thereacross, which is limited by the resistor $R_{10}$, is applied to the amplifier 24.

Figure 3:
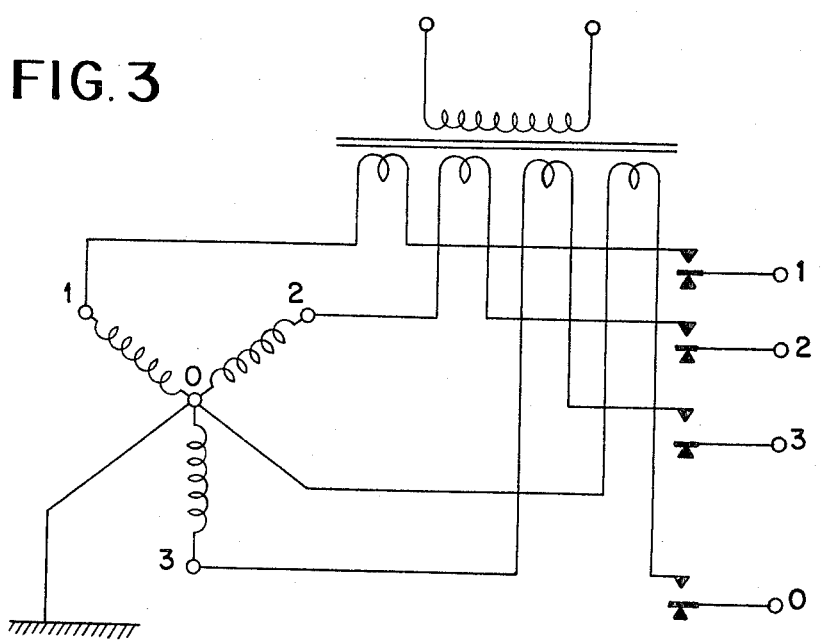
FIG. 3 is a circuit diagram showing the connections of the current sensor of FIG. 2 for use in protecting a three phase power system.

As shown in FIG. 3, an additional pair of coils $L_7'$ and $L_8'$ can be added to the transformer $T_3$ to provide protection for a three phase source, and can be compensated individually by the same technique as described above with respect to a single phase source.

In the amplifier 24, the pulses from the generator 22 are superimposed on the base of an amplifier transistor $Q_3$ along with the error voltage from the current sensor 18. However, the input voltage to the amplifier $Q_3$ is limited by a pair of opposed polarity, parallel connected diodes $D_7$ and $D_8$ coupled between the base and emitter of the transistor $Q_3$. A biasing circuit for transistor $Q_3$ includes resistors $R_9$, $R_{10}$, $R_{12}$, and $R_{13}$, and transformer windings $L_9$ and $L_{11}$. If any of these elements becomes open-circuited, the transistor $Q_3$ will be reverse biased into a cut-off condition by the voltage divider potential applied to the emitter by resistors $R_{14}$ and $R_{16}$. Then, since resistor $R_{11}$ and coil $L_{14}$ are both divided into sections, an open circuit condition in either of these elements will result in an inadequate compensation of the coils $L_7$ and $L_8$, so that an error voltage will be generated by the current sensor. Under this condition, however, since there is no overload condition, the circuit will operate to switch the load current ON and OFF through the cooperation of the control stage and the reset circuit.

The error signal, as defined by the voltage across the tube $G_2$, is coupled at one side to the junction of a resistor $R_9$ and a capacitor $C_8$, and at the other side of the resistor $R_{12}$ to the base of the amplifier transistor $Q_3$. Thus, the error signal generator is AC grounded through the capacitor $C_8$ to provide an accurate signal input to the transistor $T_3$. A bypass capacitor $C_9$ is connected from the emitter of transistor $Q_3$ to ground, and the amplified pulses are taken off the collector of the transistor $Q_3$, which collector is coupled to the supply voltage line $V_2$ through a resistor $R_{15}$. From the collector of transistor $Q_3$, the pulses are coupled through a capacitor $C_{10}$ to a transformer $T_5$, which has a center tapped secondary winding having the tap point connected to the voltage supply line $V_2$, and having the other terminals of the secondary connected through rectifying diodes to the base of a second amplifier transistor $Q_4$. In the absence of a pulse or error signal, the transistor $Q_4$ is biased into conduction by a voltage divider $R_{17}$ and $R_{18}$ connected between the supply voltage $V_2$ and ground, and having its junction connected to the base of transistor $Q_4$. Thus, when the rectified negative pulses are applied to the base of transistor $Q_4$, positive pulses are produced at the voltage divider $R_{19}$ and $R_{20}$, coupled in series from the collector of transistor $Q_4$ to ground. The junction of the voltage divider, which produces positive pulses, provides the output of the amplifier 24.

As shown in FIG. 2b, the control stage includes a relay driving transistor $Q_5$ having its base electrode connected to the output of the amplifier. An emitter resistor $R_{21}$ couples the emitter of transistor $Q_5$ to ground, and the collector of the transistor $Q_5$ is connected through the coil of a relay $K_2$ to the contacts of that relay. As described below, relay $K_2$ and the relays in the reset circuit and system detector, all control the operation of a pair of relays $K_{31}$ and $K_{32}$ in the control stage. The contacts of these relays are connected between the load and the current sensor, so that it is these contacts which control the opening and closing of the series circuit between the potential source and the load.

Under initial conditions, a voltage is induced in secondary winding $L_2$ of transformer $T_1$, and when a load is connected across the output terminals of the circuit, a current due to this induced voltage across winding $L_2$ is caused to flow through resistor $R_{35}$, winding $L_5$ of transformer $T_2$, through the contact of relays $K_{31}$ and $K_{32}$, through the load, and through the other sets of contacts of relays $K_{31}$ and $K_{32}$ back to the coil $L_2$. This current is sufficient to induce the voltage in the secondary winding $L_6$ of the transistor $T_2$ to bring transistor $Q_1$ into conduction, thereby closing relay $K_1$ and applying the supply voltages to the various circuits. When this occurs, and when switch $S_2$ is in position 2, for automatic operation, reset circuit $K_4$ energizes through the contacts of deenergized relay $K_2$. At this point, a supply voltage is applied to relay $K_2$ through the contacts of energized relay $K_4$, so that the supply voltage at the base of control stage transistor $Q_5$ causes relay $K_2$ to energize thereby locking that relay into an energized condition through its own contacts by connection between the voltage source $V_1$ and the conducting transistor $Q_5$. The amplified pulses from the pulse generator circuit are applied from the collector of transistor $Q_5$ to the base of a transistor $Q_6$ through a capacitor $C_{12}$ in the system detector. A clamping circuit is coupled between the emitter and base of the NPN transistor $Q_6$, such clamping circuit comprising a resistor $R_{25}$, and a diode $D_{11}$, and said transistor $Q_6$ has its emitter connected to the voltage supply $V_1$ through a resistor $R_{26}$. The output of the transistor $Q_6$ is taken off from its collector which is connected through a resistor $R_{27}$ to ground. A second system detector transistor $Q_7$ has a base electrode connected to the output of the transistor $Q_6$. The PNP transistor $Q_7$ has its emitter connected to ground, and its collector connected through the coil of a relay $K_5$ to the voltage supply line $V_2$. A second system detector relay $K_6$, has its coil connected between ground and the supply line $V_1$, through a resistor $R_{30}$. Thus, with the pulses coupled to the transistor $Q_6$, for biasing transistor $Q_7$ to energize relay $K_5$, and with $K_6$ energized through resistor $R_{30}$, the contacts of both relays $K_5$ and $K_6$ are closed to provide a path from the supply line $V_1$, through the energized contacts of relay $K_2$, through the deenergized contacts of relay $K_4$, through the energized contacts of relays $K_6$ and $K_5$, through the switch $S_2$, through the resistors $R_{22}$ and $R_{23}$, to the coils of the switching relays $K_{31}$ and $K_{32}$. Thus, the relays $K_{31}$ and $K_{32}$ are energized to close the series circuit between the potential source and the load.

Looking now to the various malfunctions which may occur in the circuit, it is seen that an excessive load current will cause an error signal to be generated across the tube $G_2$, thus providing amplified signals at the output of the amplifier $Q_4$. These amplified error signals cause transistor $Q_5$ to enter a non-conductive state, whereupon its contacts $K_2$ become deenergized thereby removing the supply voltage from the switching relays $K_{31}$ and $K_{32}$, in order to open the supply potential circuit to the load. Upon such deenergization of relay $K_2$, relay $K_4$ becomes energized, thereby again coupling the supply voltage $V_1$ to the relay $K_2$. However, if the error signal pulses are maintained at the base of transistor $Q_5$, then, that transistor will not conduct sufficiently to reenergize relay $K_2$. Thus, maintaining the series load circuit in an open condition. However, when the error signal is no longer applied to the amplifier, then the above-described energization of relay $K_4$ will cause relay $K_2$ to reenergize and close the circuit path by means of the relay contacts of relays $K_{31}$ and $K_{32}$. In the event that a malfunction occurs in the protective device itself, as for example, a failure of the amplifier circuit, which may give rise to an absence of pulses at the base of transistor $Q_6$, the system detector will then switch to a condition wherein transistors $Q_6$ and $Q_7$ are cut off so that relay $K_5$ is deenergized. This will remove the supply voltage from the switching relays $K_{31}$ and $K_{32}$, and again disconnect the potential source from the load. On the other hand, if the amplifier begins to produce pulses of excessive amplitude, then, the circuit will function as if there is an overload condition.

If either of transistors $Q_6$ or $Q_7$ becomes open circuited, then, again, relay $K_5$ will be deenergized, and if either of those transistors becomes short-circuited, then, the relay $K_6$ will become deenergized due to the low impedance path across its energizing coil. However, the impedance of the coil of relay $K_6$ must be sufficiently high to prevent energization of relay $K_5$ through the coil of relay $K_6$, or else, $K_5$ would be continuously energized. Capacitor $C_{13}$, connected in parallel with the coil of relay $K_5$ is to decrease any ripple voltage across that relay, and capacitor $C_{14}$ connected in parallel with relay $K_6$, is to by-pass any possible instantaneous pulses which may otherwise effect the operation of that relay.

Thus, it is seen that the protective circuit device functions to disconnect the load from the potential source whenever an abnormal current flow is detected; and, the device also performs a self-checking function to add a further safety factor to the operation of the circuit. That is, upon the sensing of an overload current by the current sensor 18, the relay $K_2$ deenergizes, thereby causing interruption of the current path through the relays $K_{31}$ and $K_{32}$, and, similarily, when there is a protection circuit malfunction, one of the relays $K_5$ or $K_6$ opens its contact thereby also interrupting the current path through the relays $K_{31}$ and $K_{32}$. Relay $K_2$ functions in opposition to relay $K_4$, the latter having a capacitor connected in parallel therewith to control the opening and closing time of the relay so that the above-described alternate, energization of relays $K_2$ and $K_4$ are accomplished. However, if the reset circuit is deemed unnecessary for a particular application, then the contacts of relay $K_4$ can be replaced by a push button, and the elements $R_{24}$, $C_{11}$ and $K_4$ can be deleted.

Furthermore, in the event it becomes desirable to disable the protective circuit device, so that the potential source and load are connected together regardless of overload conditions, then the switch $S_2$ can be moved to its position one, thereby coupling the supply voltage directly to the relay circuit $R_{22}$, $K_{31}$ and $R_{23}$, $K_{32}$. Thus, the relays $K_{31}$ and $K_{32}$ will then be energized independently of the relays $K_2$, $K_4$, $K_5$ and $K_6$.

FIG. 4 show various wave forms throughout the circuit, wherein the portions a, b, and c represent different phase relationships between the pulse generator output and the error signal. As illustrated, both such signals have the same amplitude due to the presence of the diodes $D_7$ and $D_8$ which limit the signal applied to the transistor $Q_3$. The phase relationship is seen readily from graphs (A) and (B) which show the error signal and the pulse generator output, respectively, while graph (C) shows the superposed wave form applied to the base of transistor $Q_3$. The phase relationship between the pulses and the error signal is controlled by the components $C_5$ and $R_8$ at the input of transistor $Q_3$ and if such control is not sufficient to arrange the phase relationship, then, the leads of inductor $L_9$ can be reversed, thereby reversing the polarity from that shown in portions (a) to (c). Finally, graph (E) shows the wave form at the collector of transistor $Q_5$ wherein the relay $K_2$ produces negative inductive pulses when the error signal is present. It is these inductively produced negative pulses which operate the system detector circuitry to maintain relay $K_5$ in an energized condition.

In the absence of an abnormal current signal from the current sensor, the transistor $Q_5$ will remain in its energized condition, since the positive pulses from the pulse generator circuit, coupled to the base of transistor $Q_5$, will have a duration which is insufficient to deactuate relay $K_2$. Thus, the contacts of relay $K_2$ will remain in their energized position, and transistors $Q_6$ and $Q_7$ will maintain relay $K_5$ in an energized condition due to the coupling of the negative pulses from the collector of $Q_5$ through the capacitor $C_{12}$ to the base of the transistor $Q_6$.

As described above, when a failure occurs in the protective circuit, so that pulses fail to appear at the input to the system detector, then relay $K_5$ becomes deenergized. Also, when the impedance across transistor $Q_7$ becomes too low, then, the relay $K_6$ will become deenergized. The above-described relation between the impedances of $K_5$ and $K_6$, which relationship prevents the two transistors from becoming energized merely due to their series connection across the supply voltage $V_2$, is determined as follows:

Assuming a decrease in the excitation voltage to $\Delta V$ is necessary for deenergizing relay $K_5$, then, to prevent relay $K_5$ from being energized again through the path defined by the coil of relay $K_6$, it is necessary that the excitation potential across the coil of relay 5 must be less than $\Delta V$ in the absence of conduction of transistor $Q_7$. If the collector voltage of transistor $Q_7$ in the absence of interrupting pulses is $V$, and if the resistances of the relay coil $K_5$ and $K_6$, $r_5$ and $r_6$, respectively, are small, then, we have, $$\frac{V-V_2}{r_5}+\frac{V-V_1}{R_{30}}+\frac{V}{r_6}=0$$

or, $$V=\left(\frac{V_2}{r_5}+\frac{V_1}{R_{30}}\right)\cdot\frac{r_5 r_6 R_{30}}{r_5 r_6+r_6 R_{30}+R_{30} r_5}$$

where $V_1$ and $V_2$ are the potentials of the excitation sources of the relays $K_6$ and $K_5$, respectively. Then, letting $r_6=nr_5$, $R_{30}=mr_6=mnr_5$, where $n$ and $m$ are positive real numbers, and where $m$ is dependent upon the potential of the excitation voltage of relay $K_6$, then the above equation can be simplified to $$V=\frac{mnV_2+V_1}{mn+m+1}$$

For the system detector to be functional, the following relationships should hold true $V-V_2 \leq \Delta\Delta V$, or, $V\leq V_2+\Delta V$. When this relation is substituted into the above equation, then, $$\frac{mnV_2+V_1}{mn+m+1}\leq V_2+\Delta V$$

This equation must be satisfied in order to permit the direct connection between the coil of relay $K_6$ and the collector transistor $Q_7$. For example, if $V_1=26v$, $V_2=-13v$, $m=5$, $r_5=300$ and $V=3v$, then the calculated condition is $$n\geq\frac{34}{15},\ r_6\geq 300\times\frac{34}{15}=680$$

If then, $r_6=1K$, then, $r_{30}$ must$=5K$.

Alternatively, the coil of relay $K_6$ can be connected through a diode (not shown) to the collector of transistor $Q_7$, in a cathode to anode polarity therebetween, wherein the diode can be biased into non-conduction by choosing the value of resistor $R_{26}$. Then, when transistor $Q_7$ conducts beyond some predetermined limit, the diode tends to conduct and contributes a shunting effect upon the relay $K_6$. In that manner, the excitation potential of the relay $K_6$ must be equal to the sum of the voltage drop across the diode and the potential at the collector of transistor $Q_7$. The heavier the conduction of transistor $Q_7$, the less will be absolute potential at its collector terminal. So long as the conduction of transistor $Q_7$ is heavier than a predetermined level, the excitation potential of the relay $K_6$ will drop below its required holding value so that its contacts will open thereby causing deenerigization of the relay $K_{31}$ and $K_{32}$. Although this modification simplifies the circuit, it reduces the reliability of the device in the event the diode becomes open-circuited thereby causing the failure of transistor $Q_7$. On the other hand, if the diode becomes short-circuited, then relay $K_5$ may be permanently energized. However, since the diode is normally operated in a cut-off condition, its predicted life span is highly increased.

Techniques other than the above-described pulse technique can be used in the system detector, as for example, replacing the disclosed pulse generator with a high frequency device for providing a source of periodic signals, such as a sinusoidal or square wave generator. However, the period of the wave must be sufficiently short as compared to the contacting and open times of the relay $K_2$ so that the operation of relay $K_2$ will not be effected thereby. In this case, four additional elements would be used, including a transformer having its primary winding connected in series with the primary winding of transformer $T_5$, and its secondary winding connected across resistor $R_{19}$; and a by-pass capacitor connected across the primary winding of transformer $T_5$ for by-passing high frequency signals, wherein the capacitor can have a relatively small value thereby having less effect on the response time for switching off the load circuit, if the frequency of the generator is high; a high frequency choke connected in the collector circuit of transistor $Q_5$ to serve as a load for the high frequency detecting signals; and, a by-pass capacitor connected across the coil $K_2$. Alternatively, the choke can be replaced by a high frequency transformer whereby the system detector will obtain the detecting signal from the secondary of the high frequency transformer instead of from the collector of transistor $Q_5$.

The following will be a detailed description of the operation of the invention;

Under normal operating conditions, the coil $L_{10}$ of transformer $T_6$ will have its terminals short-circuited by the switching relays $K_{31}$ and $K_{32}$ through resistances $R_{33}$ and $R_{34}$. Therefore, under normal conditions no signal is present across the coil $L_{11}$. If a leakage load is connected from one of the output terminals to ground, then, as described above, the relays $K_{31}$ and $K_{32}$ will be opened and coil $L_{10}$ will then have the leakage current following therethrough. Coil $L_{10}$ has a large number of turns, so that a small leakage current will induce a sufficient voltage across coil $L_{11}$ to generate an abnormal-current signal sufficient to actuate the control stage to deenergize the switching relays. Assuming the sensitivity of this portion of the circuitry as being $\Delta I_O$ the corresponding impedance of the leakage load as $R_{eo}$, the error signal as $E_o$, and the flux as $\phi_o$, then a leakage load having an impedance value $R_e$ between O and $R_{eo}$ will induce an error signal greater than $E_o$. Further, if $R_{33}$ equals $R_{34}=MR_{eo}$, then, the corresponding leakage current will be between $\Delta I_e/M$ and $\Delta I_o/(M+1)$. Therefore, the leakage current will be decreased to $1/(M+1)$ of the value which it would have had if the output terminals had not been open-circuited by the switching relay. Thus, this limited current will not destroy anything at the output terminals and is generated merely to detect the continued existence of the leakage load. If the coil $L_{11}$ has the same number of turns as the coil $L_9$, and the coil $L_{10}$ has M times the turns of coil $L_7$, then a leakage current having a value between $\Delta I/(M+1)$ and $\Delta I/M$ will generate a corresponding flux lying between $(M+1)$ $E_o/M$ and $E_o$. This signal is obviously strong enough to maintain the output terminals in their open condition. If the leakage load is removed, then the error signal falls to zero and the reset circuit will again energize relays $K_{31}$ and $K_{32}$.

In the actual physical circuitry for the discolsed protective circuit device, the transformer $T_6$ can be omitted by winding the coil $L_{10}$ together with coil $L_7$ on the transformer $T_3$, since the separate windings are shown spaced apart merely for ease of description.

In the case of a load current overload, the resistor $R_{11}$ is adjusted to permit the uninterrupted current flow $I_o$ for a maximum load impedance $R_{Lo}$. Again, assuming the error signal to be $E_o$, the current sensor must generate an error signal larger than $E_o$ until removal of the load $R_{Lo}$.

As described above, when the excessive load is first sensed by the device, the switching relay contacts will be opened, but a voltage across the coil $L_2$ will be applied to the load through the circuits $R_{35}$, $L_5$ and $R_{36}$, $L_{13}$, respectively. The voltage from coil $L_2$ is very low as compared to the source voltage, and is too low to damage the load. Assuming a value for $R_{36}$ which is equal to $R_{Lo}$, and the value across the coil $L_2$ as $1/M \times$ the source voltage, where M is greater than 1, then the new load current due to the voltage on the coil $L_2$ is between $I_o/M$ and $I_o/2M$, for a load $R_L$ lying between zero and $R_{Lo}$. If the turns of the coil $L_{13}$ and $2M \times$ those of the coil $L_{12}$, then the error signal lying between $2E_o$ and $E_o$ will be obtained when taken from the tap on the resistor $R_{11}$ and the center tap of the coil $L_{14}$. This error signal is of course, capable of keeping the output terminals in an open state. The turns of the coil $L_{13}$ may not be exactly $2M \times$ those of the coil $L_{12}$, since the partial error signal is contributed to by the unbalance of coils $L_7$ and $L_8$ under normal conditions, but is determined entirely by the transformer $T_4$ when the switching relays have been opened. This difference can be compensated by properly choosing the value of resistor $R_{36}$, which must be dependent upon the prescribed overload level. Usually, this resistor can be selected to have a value around the value of the impedance $R_{Lo}$, wherein the less the value of $R_{36}$ the higher the sensitivity to variations and load impedance, but the higher the detecting current is required. If the overload is then reduced to the predetermined load value, then the error signal becomes too weak to cut off the transistor $Q_5$ and the reset circuit will initiate the switching to cause relays $K_{31}$ and $K_{32}$ to be energized again. Coil $L_5$ has $2M \times$ the number of turns of coil $L_4$, and it functions in a cut-off state for the same purpose as coil $L_4$ under normal conditions. Also, the resistor $R_{34}$ is provided to compensate for the inexact winding of the coil $L_5$ in the same technique as described above.

Finally, the indicator 30 includes five lamp devices, as shown in FIG. 26, for use in determining the operational conditions of the protective device. For example, gas lamp $G_3$ is used for indicating an overload condition, and is connected in parallel with resistor $R_{38}$ and in series with resistor $R_{37}$ and coil $L_{15}$ of transformer $T_4$. Transformer $T_4$ is wound so that coil $L_{13}$ will induce a voltage on coil $L_{15}$ sufficient to light the gas lamp $G_3$ when a current equal or greater than $I_o/2M$ flows through the coil $L_{13}$. This current corresponds to current $I_o$ just prior to opening of the switching relay contacts. As will be easily understood, the brightness of the lamp $G_3$ is dependent on the degree of overloading, so that if a short circuit across the output terminals is present, then the lamp $G_3$ will be at its brightest. On the other hand, if the load current is less than the predetermined value $I_o$, then the lamp $G_3$ will not be lit. The sensitivity of the lamp to these currents is easily controlled by the values of resistors $R_{37}$ and $R_{38}$.

Gas lamps $G_4$ and $G_5$ are used to indicate the presence of an excessive leakage current from output terminals 14a and 14b, respectively, and under normal operating conditions, these two lamps are fully lit, while their brightness is dimmed by the presence of the additional resistors $R_{33}$ and $R_{34}$ when the current contacts of the switching relays are opened. Preferably, resistors $R_{33}$ and $R_{34}$ are chosen to provide no light from the lamps $G_4$ and $G_5$ when a leakage resistance less than $R_{eo}$ is connected to either of terminals 14a or 14b, respectively. Furthermore, by placing a series connected resistor and switch in parallel with each resistor $R_{33}$ and $R_{34}$, as shown for example at switches $S_3$, $S_4$ and resistors $R_{41}$ and $R_{42}$, then a further check can be made to determine the relative amplitude of the leakage resistors $R_e$. That is, if for example, no light is emitted from lamp $G_5$, signifying a high leakage current I, then switch $S_4$ can be closed to place a higher voltage across lamp $G_5$ to determine whether that value will be sufficient to light the lamp. Thus, if the lamp does not light, then it is ascertained that the leakage current is higher than this predetermined value. Also, it can be seen that additional output terminals and indicating lamps can be readily added to the system.

Gas lamps $G_6$ and $G_7$ are used to indicate malfunctions in the protective circuit device itself. Both such lamps are caused to glow under normal operation conditions, that is, when relays $K_5$ and $K_6$ are energized. However, when either of those relays is deenergized, then its associated lamp ceases to glow due to the voltage divider defined by resistor $R_{32}$, which decreases the voltage across that lamp. Thus, when lamp $G_6$ ceases to glow, the indication is that a failure has occurred in the protective circuit, which failure has caused a cessation of the pulses applied to transistor $Q_6$. On the other hand, when lamp $G_7$ ceases to glow, there is an indication that transistor $Q_7$ is conducting excessively, or that that transistor is short-circuited. Accordingly, it can be seen that the system provides many protective functions, while giving an indication when a malfunction occurs, and while indicating the nature of such malfunction.

What I claim is:

1. A protective circuit for connection between a potential source and a load to disconnect the load upon sensing of an overload or shock current, comprising current sensing means and switch means connected in series for series connection with a potential source and a load, said sensing means having means for producing a predetermined output signal in response to an overload current flow therethrough; a control stage including said switch means and including control means responsive to the presence of said predetermined output signal to open said switch means; a periodic-signal generator; amplifier means having first and second input conductors respectively to said signal generator and sensing means and having an output conductor connected to said control means, for superposing and amplifying said periodic signal and predetermined output signal for application to said control means; detector means connected to said control means for detecting the presence and absence of said periodic signal at said control means and for actuating said control means to open said switch means in response to an absence of said detected periodic signal, said detector means comprising a first transistor connected to said control means for generating a bias signal in response to the presence of said periodic-signal at said control means, a first relay, a second transistor having an energization coil of said relay connected as a load therefor and having a control electrode connected to receive said bias signal for energizing said relay in response to said bias signal, and said relay having contact means connected to said control means to control the operation of said switch means.

2. A protective circuit as set forth in claim 1, in which said detector means includes a second relay having an energization coil coupled in parallel with a pair of principal conducting electrodes of said second transistor for deenergization upon a predetermined excessive current flow through said second transistor, said second relay having contacts connected in circuit with said contacts of said first relay to control the operation of said switch means.

3. A protective circuit as set forth in claim 2, further comprising indicator means including a plurality of lamps and means connecting said lamps to said contacts of said first and second relay contacts for controlling the lighting of said lamps to indicate malfunctions in the signal generator, amplifier, control means, and detector means.

4. A protective circuit as set forth in claim 2, in which said control means includes a third relay having contacts connected in circuit with said contacts of said first and second relays, a third transistor having a control electrode connected to said amplifier output conductor and having an energization coil of said third relay connected as a load, wherein the energization state of said third relay is responsive to the presence and absence of said predetermined sensing means output signal.

5. A protective circuit as set forth in claim 4, in which said switch means of said control stage comprises a fourth relay having a set of contacts, and having an energization coil connected in circuit with said first, second and third relay contacts, wherein said series connection of said sensing means and switch means comprises a series connection between said forth relay contacts, and said sensing means.

6. A protective circuit as set forth in claim 5, further comprising reset circuit means connected to said control means for automatically closing said switch means in the absence of said predetermined sensing means output signal, said reset circuit means including a fifth relay having an energization coil coupled to said contacts of said third relay and having a set of contacts connected in circuit between said third relay contacts and said first, second and fourth relay contacts.

7. A protective circuit for connection between a potential source and a load to disconnect the load upon sensing of an overload current, comprising current sensing means and switch means connected in series for series connection with a potential source and a load, said sensing means having means for producing a predetermined output signal in response to an overload current flow therethrough; a control stage including said switch means and including control means responsive to the presence of said predetermined output signal to open said switch means; a periodic-signal generator; amplifier means having first and second input conductors respectively to said signal generator and sensing means and having an output conductor connected to said control means, for superposing and amplifying said periodic signal and predetermined output signal for application to said control means; detector means connected to said control means for detecting the presence and absence of said periodic signal at said control means and for actuating said control means to open said switch means in response to an absence of said detected periodic sigal, power supply means connected to said signal generator, amplifier, control stage and detector means for supplying power thereto, said power supply means including means for detecting the presence of a load connected to said protective circuit for actuating said power supply only upon sensing said load connection, thereby automatically energizing said protective circuit upon sensing said load connection.

8. A protective circuit as set forth in claim 7, in which said power supply means includes a power transformer for connection to said potential source, a rectifier for producing a DC supply voltage, a relay having contacts connected to said rectifier to switch said DC supply voltage, a transistor having an energization coil of said relay connected as a load thereof, and a second transformer having a primary winding connected to sense a current flow to said load and a secondary winding connected to a control electrode of said transistor.

9. A protective circuit for connection between a potential source and a load to disconnect the load upon sensing of an overload current, comprising current sensing means and switch means connected in series for series connection with a potential source and a load, said sensing means having means for producing a predetermined output signal in response to an overload current flow therethrough; a control stage including said switch means and including control means responsive to the presence of said predetermined output signal to open said switch means; a periodic-signal generator; amplifier means having first and second input conductors respectively to said signal generator and sensing means and having an output conductor connected to said control means, for superposing and amplifying said periodic signal and predetermined output signal for application to said control means; detector means connected to said control means for detecting the presence and absence of said periodic signal at said control means and for actuating said control means to open said switch means in response to an absence of said detected periodic signal, said sensing means including a first transformer having dual primary windings connected to sense load and leakage currents, respectively, and a second transformer connected to compensate said predetermined output signal for inherent unbalanced winding characteristics between said dual primary windings, thereby increasing the accuracy of said sensing.

10. A protective circuit as set forth in claim 9, in which said control means includes a first relay, a transistor having a control electrode connected to said amplifier output conductor, and having an energization coil of said first relay connected as a load, wherein the energization state of said first relay is responsive to the presence and absense of said predetermined sensing means output signal, and in which said switch means includes a second relay having a set of contacts and having an energization coil coupled in circuit with a set of contacts of said first relay, wherein said series connection of said sensing means and switch means comprises a series connection between said second relay contacts and said sensing means.

11. A protective circuit for connection between a potential source and a load to disconnect the load upon sensing of an overload current, comprising current sensing means and switch means connected in series for series connection with a potential source and a load, said sensing means having means for producing a predetermined output signal in response to an overload current flow therethrough; a control stage including said switch means and including control means responsive to the presence of said predetermined output signal to open said switch means; a periodic-signal generator; amplifier means having first and second input conductors respectively to said signal generator and sensing means and having an output conductor connected to said control means, for superposing and amplifying said periodic signal and predetermined output signal for application to said control means; detector means connected to said control means for detecting the presence and absence of said periodic signal at said control means and for actuating said control means to open said switch means in response to an absence of said detected periodic signal, said sensing means including means for sensing both load and leakage current overloads, and indicator means connected to said sensing means and detector means for indicating the presence of load and leakage current overloads, for indicating malfunctions in the signal generator, amplifier and control means, and for indicating malfunction in said detector means.

12. A protective circuit for connection between a potential source and a load to disconnect the load upon sensing of an overload current, comprising current sensing means and switch means connected in series for series connection with a potential source and a load, said sensing means having means for producing a predetermined output signal in response to an overload current flow therethrough; a control stage including said switch means and including control means responsive to the presence of said predetermined output signal to open said switch means; a periodic-signal generator; amplifier means having first and second input conductors respectively to said signal generator and sensing means and having an output conductor connected to said control means, for superposing and amplifying said periodic signal and predetermined output signal for application to said control means; detector means connected to said control means for detecting the presence and absence of said periodic signal at said control means and for actuating said control means to open said switch means in response to an absence of said detected periodic signal, said control means including a first relay, a transistor having a control electrode connected to said amplifier output conductor, and having an energization coil of said first relay connected as a load, wherein the energization state of said first relay is responsive to the presence and absence of said predetermined sensing means output signal, and said switch means including a second relay having a set of contacts, and having an energization coil coupled in circuit with a set of contacts of said first relay wherein said series connection of said sensing means and switch means comprises a series connection between said second relay contacts and said sensing means.

13. A protective circuit for connection between a potential source and a load to disconnect the load upon sensing of an overload current and comprising, current-sensing means connected with a potential source and a load, said sensing means comprising a transformer having dual primary windings unbalanced in winding turns and a secondary winding for generating an error signal in response to the abnormal condition of an overload and leakage current flow through the transformer, self-detecting means automatically detecting whether the protective circuit is in condition for proper functioning and for commanding disconnecting the load from said potential source if said protective circuit is not functioning normally, and means comprising a control stage for disconnecting the load from said potential source in response to said error signal and in response to detection by said self-detecting means that said protective circuit is functioning abnormally.

References Cited
UNITED STATES PATENTS

| | | | |
|---|---|---|---|
| 3,217,207 | 11/1965 | Webb | 317—33 SC |
| 3,419,757 | 12/1968 | Steen | 317—33 SC |
| 3,558,983 | 1/1971 | Steen | 317—33 SC |

JAMES D. TRAMMELL, Primary Examiner

U.S. Cl. X.R.

317—23, 27 R, 33 R, 60 A; 340—253 A